US012786949B2

(12) United States Patent
You et al.

(10) Patent No.: US 12,786,949 B2
(45) Date of Patent: Nov. 3, 2026

(54) METHOD AND SYSTEM FOR RAPIDLY CONSTRUCTING WIRELESS CHANNEL KNOWLEDGE MAP

(71) Applicant: Southeast University, Nanjing (CN)

(72) Inventors: Li You, Nanjing (CN); Zhenzhou Jin, Nanjing (CN); Chenjie Xie, Nanjing (CN); Xiqi Gao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 288 days.

(21) Appl. No.: 18/727,295

(22) PCT Filed: Nov. 17, 2023

(86) PCT No.: PCT/CN2023/132175

§ 371 (c)(1),
(2) Date: Jul. 8, 2024

(87) PCT Pub. No.: WO2025/097476

PCT Pub. Date: May 15, 2025

(65) Prior Publication Data

US 2026/0262014 A1 Sep. 3, 2026

(30) Foreign Application Priority Data

Nov. 8, 2023 (CN) ......................... 202311478685.6

(51) Int. Cl.
*H04W 64/00* (2009.01)
*G06T 11/60* (2026.01)
(Continued)

(52) U.S. Cl.
CPC ........... *H04W 64/006* (2013.01); *G06T 11/60* (2013.01); *H04B 17/3913* (2015.01); *H04W 24/06* (2013.01); *G06T 2210/32* (2013.01)

(58) Field of Classification Search
CPC ..... H04W 64/006; H04W 24/06; G06T 11/60; G06T 2210/32; H04B 17/3913
See application file for complete search history.

(56) References Cited

U.S. PATENT DOCUMENTS

| | | | | |
|---|---|---|---|---|
| 11,094,135 | B1 * | 8/2021 | Palmer | G06T 19/006 |
| 11,778,593 | B2 * | 10/2023 | Evans | H04W 72/02 370/329 |

(Continued)

FOREIGN PATENT DOCUMENTS

| | | | |
|---|---|---|---|
| CN | 104618045 A | 5/2015 | |
| CN | 113938935 A | 1/2022 | |

(Continued)

OTHER PUBLICATIONS

Li et al., "Channel Knowledge Map for Environment-Aware Communications: EM Algorithm for Map Construction," 2022 IEEE Wireless Communications and Networking Conference (WCNC), Austin, TX, USA, 2022, pp. 1659-1664, doi: 10.1109/WCNC51071.2022.9771802. (Year: 2022).*

(Continued)

*Primary Examiner* — Yuwen Pan
*Assistant Examiner* — Samuel H. Leonard
(74) *Attorney, Agent, or Firm* — MUNCY, GEISSLER, OLDS & LOWE, P.C.

(57) ABSTRACT

A method and system for rapidly constructing a wireless channel knowledge map. A channel knowledge map is constructed by image inpainting technique, and channel knowledge at a specific location is predicted by recovering the corresponding pixel value in an image matrix, so that channel-related knowledge of user equipment at any location in a targeted area is obtained. An input environmental map is decomposed at different frequencies by combining the similarity between the image inpainting problem and the channel knowledge map construction problem and by using (Continued)

a frequency band decomposition framework of a Laplacian pyramid. According to the characteristics of different frequency components, corresponding subnetworks are designed for feature extraction. Finally, the channel knowledge map is reconstructed by the inverse operation of the Laplacian pyramid. The method not only achieves higher construction accuracy at lower computational complexity, but also has strong generalization ability in various wireless communication scenarios.

10 Claims, 6 Drawing Sheets

(51) Int. Cl.

*H04B 17/391* (2015.01)
*H04W 24/06* (2009.01)

(56) References Cited

U.S. PATENT DOCUMENTS

| | | | | |
|---|---|---|---|---|
| 2005/0243936 | A1* | 11/2005 | Agrawala | H04B 17/318<br>375/259 |
| 2013/0035109 | A1* | 2/2013 | Tsruya | G01S 5/02526<br>455/456.1 |
| 2023/0037893 | A1* | 2/2023 | Vankayala | G06F 18/24133 |

FOREIGN PATENT DOCUMENTS

| | | | |
|---|---|---|---|
| CN | 114817565 | A | 7/2022 |
| CN | 116471547 | A | 7/2023 |
| KR | 20120138208 | A | 12/2012 |

OTHER PUBLICATIONS

Pushpalwar et al., “Image Inpainting Approaches—A Review,” 2016 IEEE 6th International Conference on Advanced Computing (IACC), Bhimavaram, India, 2016, pp. 340-345, doi: 10.1109/IACC.2016.70. (Year: 2016).*

Wu et al., “Environment-Aware and Training-Free Beam Alignment for mmWave Massive MIMO via Channel Knowledge Map,” 2021 IEEE International Conference on Communications Workshops (ICC Workshops), Montreal, QC, Canada, 2021, pp. 1-7, doi: 10.1109/ICCWorkshops50388.2021.9473871. (Year: 2021).*

Zeng et al., “Toward Environment-Aware 6G Communications via Channel Knowledge Map,” in IEEE Wireless Communications, vol. 28, No. 3, pp. 84-91, Jun. 2021, doi: 10.1109/MWC.001.2000327. (Year: 2021).*

* cited by examiner

METHOD AND SYSTEM FOR RAPIDLY CONSTRUCTING WIRELESS CHANNEL KNOWLEDGE MAP

TECHNICAL FIELD

The present invention belongs to the technical field of communications, and relates to a channel knowledge map construction method and system based on an image inpainting method.

BACKGROUND

With the increase in the number and density of connected devices, the expansion of antenna array size and the wider use of bandwidth, 6G will involve wireless channels of ultra-large dimensions. The traditional pilot-based channel training and feedback methods to obtain real-time channel state information (CSI) will result in excessive overhead. Notably, a wireless propagation environment, such as the geometric location relationship in a city or terrain map, is not only static, but also a key factor affecting the channel parameters and the performance of a wireless communication system. Therefore, environment-aware wireless communication has aroused great research interest and attention in academia and industry. A channel knowledge map (CKM) plays a key role in the environment-aware wireless communication, acting as a specific database, marked with precise locations of transmitters and receivers. Within this database, essential channel-related details are stored, providing valuable information such as channel gain, shadowing, angle of arrival/departure angle, and channel impulse response. The channel-related information can be acquired by effectively utilizing propagation environment information, so that the problem of high complexity in real-time CSI acquisition can be solved. A typical example of CKM is a channel gain map (CGM), which is used to predict the channel gain at a specific location in a targeted area.

Traditional methods are based on data-driven interpolation methods and algorithms based on model-driven parameter fitting. However, the existing CKM construction methods based on interpolation and model-driven parameter fitting do not fully consider the specific wireless propagation environment. Therefore, there are some limitations in the implementation process, for example, too many location points that are required to be measured, hug storage capacity, high computational complexity, and low estimation accuracy.

SUMMARY

Objective of the invention: in view of the shortcomings in the prior art, an objective of the present invention is to provide a method and system for rapidly constructing a wireless channel knowledge map, which can obtain channel knowledge information corresponding to user equipment at a specific location in a targeted area of a base station, thereby further reducing the time complexity and storage complexity compared with the existing methods while ensuring the reconstruction accuracy.

Technical solutions: to achieve the above objective of the invention, the present invention provides a method and system for rapidly constructing a wireless channel knowledge map. Through an end-to-end Laplacian pyramid (LP)-based CKM construction method, the CKM construction problem is transformed into an image-to-image inpainting task, corresponding subnetworks are designed according to the importance of different components, and self-attention mechanism and cross attention mechanism are further introduced to encode global structure information, so that the reconstruction accuracy and generalization ability of a model can be improved. The method for rapidly constructing the wireless channel knowledge map includes the following steps:

- acquiring environment information of a targeted area, and transforming the environment information into a 2D image format through a spatial discretization method and pixel-level grayscale transformation, thereby transforming a channel knowledge map construction problem into an image inpainting task;
- decomposing an environment map at different frequency bands by using a Laplacian pyramid to obtain different frequency components;
- constructing a channel knowledge map reconstruction network model, wherein the network model designs different subnetworks for different frequency components of the environment map for feature extraction, and the channel knowledge is reconstructed by the different frequency components with assistance of an inverse operation of the Laplacian pyramid after outputting through the respective subnetworks;
- giving a training set comprising the environment map and the corresponding channel knowledge map, and training the constructed network model in an end-to-end supervised training mode to obtain optimal parameters of the model; and predicting channel knowledge information of user equipment at a specific location in the targeted area by the trained model.

Preferably, the transformation from the channel knowledge map construction problem to the image inpainting problem is to take each specific location as a pixel point of an image matrix, take channel knowledge corresponding to the specific location as a pixel value of the corresponding pixel point, and transform the channel knowledge estimation problem of each specific location into the pixel recovering problem between images.

Preferably, the spatial discretization method is to grid the environment information in the spatial dimension, and is performed according to a minimum distance criterion.

Preferably, the grayscale transformation is implemented at a pixel level, and a channel knowledge value is converted into a range of 0 to 1 by using min-max normalization.

Preferably, the frequency band decomposition utilizes a Gaussian pyramid to obtain the Laplacian pyramid, thereby obtaining different frequency components. For a pair of environment map and channel knowledge map, the difference in low-frequency components is more remarkable than that in high-frequency components; and feature extraction layers of subnetworks corresponding to the low-frequency components are more than feature extraction layers of subnetworks corresponding to the high-frequency components.

Preferably, the above model mainly includes:

reconstruction on low-frequency component in the $L^{th}$ layer: the input environment map is decomposed into submaps at different frequency bands, and feature extraction and reconstruction are completed by the specific attributes of the submaps. Firstly, a low-frequency environment submap $I_L$ is subjected to a point convolution to complete dimensional expansion in a depth direction. Then, the low-frequency environment submap is input into a plurality of stacked lightweight residual dilated convolutions (LRDC) modules to deepen a feature extraction network and obtain the fusion of multi-scale features. Then, the low-frequency environment submap is input to a multi-head self-attention (MHSA) module to encode global random structure information into local features in the spatial dimension and learn richer hierarchical feature representations. Finally, the number of color channels in a feature map is reduced to the original size to obtain an output result $\hat{I}_L$.

Refinement on high-frequency component in the $(L-1)^{th}$ layer: the low-frequency component and the reconstruction result thereof are fused to gradually guide the refinement of the high-frequency components so as to obtain the components with different frequencies for reconstruction of the channel knowledge map. Firstly, the low-frequency environmental submap $I_L$ and the predicted channel knowledge submap $\hat{I}_L$ are respectively bilinearly upsampled. Then, the low-frequency component $I_L$, the reconstruction result $\hat{I}_L$ of the low-frequency component and the high-frequency component $r_{L-1}$ in the $(L-1)^{th}$ layer are concatenated and input to the plurality of stacked LRDC modules. Then, the extracted multi-scale feature map is input to a multi-head cross-covariance attention (MHCCA) module. Finally, the refined result of the high-frequency component $r_{L-1}$ in the $(L-1)^{th}$ layer and an attention map for refining the high-frequency component in the $(L-2)^{th}$ layer are obtained. For the remaining frequency components $R=[r_0, \ldots, r_{L-2}]$, all the high-frequency components of the Laplacian pyramid are gradually refined through iterative upsampling and concatenating operations, the LRDC module, and the MHSA module or the MHCCA module, and the prediction results of different components are obtained. The channel knowledge map can be reconstructed through the inverse operation of the Laplacian pyramid. The number of the LRDC modules used for the low-frequency subnetworks and the high-frequency subnetworks is decreasing, and each subnetwork can use the MHSA or MHCCA module without considering the computational complexity.

Preferably, the LRDC module is formed by a depthwise separable dilated convolution layer, an instance normalization layer, a point convolution layer and a Gaussian Error Linear Unit (GELU) activation function layer and is used for extraction and representation of features. The MHSA module is formed by a normalization layer, a multi-head self-attention layer, a point convolution layer and a GELU activation function layer. The MHCCA module is formed by a normalization layer, a multi-head cross-covariance attention layer, a point convolution layer and a GELU activation function layer, and is used for encoding global environment information.

Preferably, the model is trained with parameters by using an Adam optimization algorithm in an end-to-end supervised training mode, so that a loss function is minimized, thereby obtaining optimal model parameters, mainly including weights and offsets of the point convolution layer, the depthwise separable dilated convolution layer, the multi-head self-attention layer and the multi-head cross-covariance attention layer. The loss function is expressed as:

$$\min_{\Theta} \mathcal{L}(\mathbb{G}_k, \hat{\mathbb{G}}_k) = \mathbb{E}\left\{\sum_{K} \|\mathbb{G}_k - \mathcal{R}_g(\mathbb{F}_k(x_n, \epsilon); \Theta)\|_2^2\right\},$$

where K denotes the total number of training set samples, $\hat{\mathbb{G}}_k$ denotes the reconstructed channel knowledge map, $\mathbb{G}_k$ denotes a real channel knowledge map, $\mathcal{R}_g$ denotes the constructed network model, Θ denotes a parameter set to be learned in $\mathcal{R}_g$, $\mathbb{F}_k(x_n, e)$ denotes the environment map, e denotes a propagation environment, $x_n$ denotes the location of the user equipment, and $\|\bullet\|_2$ denotes Euclidean norm.

The present invention further provides a computer device, including a memory, a processor, and a computer program stored in the memory and executable on the processor, where the computer program is configured to, when loaded to the processor, implement the method for rapidly constructing the wireless channel knowledge map.

Based on the same inventive concept, the present invention further provides a wireless communication system, including a base station and a plurality of user terminals. The base station or the user terminal is provided with: an information processing module, configured to acquire environment information of a targeted area, and transform the environment information into a 2D image format through a spatial discretization method and pixel-level grayscale transformation, thereby transforming a channel knowledge map construction problem into an image inpainting task; a frequency band decomposition module, configured to decompose an environment map at different frequency bands by using a Laplacian pyramid to obtain different frequency components; a network model construction module, configured to construct a channel knowledge map reconstruction network model, where the network model designs different subnetworks for different frequency components of the environment map for feature extraction, and the channel knowledge map is reconstructed by the different frequency components with assistance of an inverse operation of the Laplacian pyramid after outputting through the respective subnetworks; a model training module, configured to give a training set including the environment map and the corresponding channel knowledge map, and train the constructed network model in an end-to-end supervised training mode to obtain optimal parameters of the model; and a prediction module, configured to predict channel knowledge information of user equipment at a specific location in the targeted area by the trained model.

Beneficial effects: compared with the prior art, the present invention has the following beneficial effects: the channel knowledge map construction problem is transformed into the image inpainting problem, the corresponding subnetworks are designed for the frequency components with different characteristics based on a reversible frequency band decomposition architecture of a Laplacian pyramid, the reconstruction of the low-frequency components and the refinement of the high-frequency components are completed, and finally, the reconstruction of the channel knowledge map is completed through the inverse operation of the Laplacian pyramid. According to the proposed method for rapidly constructing the wireless channel knowledge map, channel knowledge information of user equipment at a potential location in a targeted area can be obtained with low time complexity and storage complexity on the premise of ensuring the reconstruction accuracy. The obtained channel knowledge can further assist the acquisition of real-time channel state information of large-scale wireless communication and improve the system performance, thereby further improving the overall transmission efficiency of the system. In addition, the method proposed in the present invention has strong generalization ability and is suitable for different large-scale wireless communication scenarios.

DESCRIPTION OF THE EMBODIMENTS

The technical solutions provided by the present invention are described below in detail with reference to specific embodiments. It is understood that the specific embodiments are only used to describe the present invention and not intended to limit the scope of the present invention.

Figure 1:
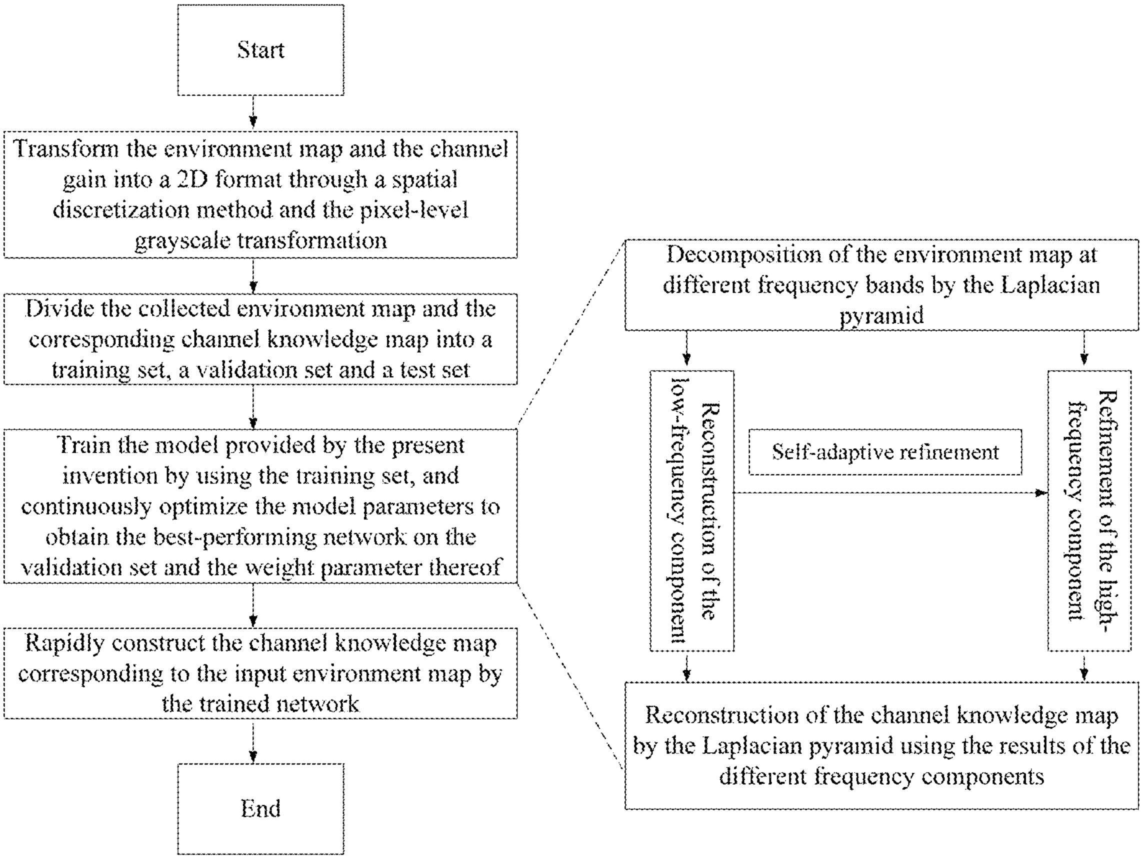
FIG. 1 is a flowchart of a process for rapidly constructing a channel knowledge map according to an embodiment of the present invention.
Figure 2:
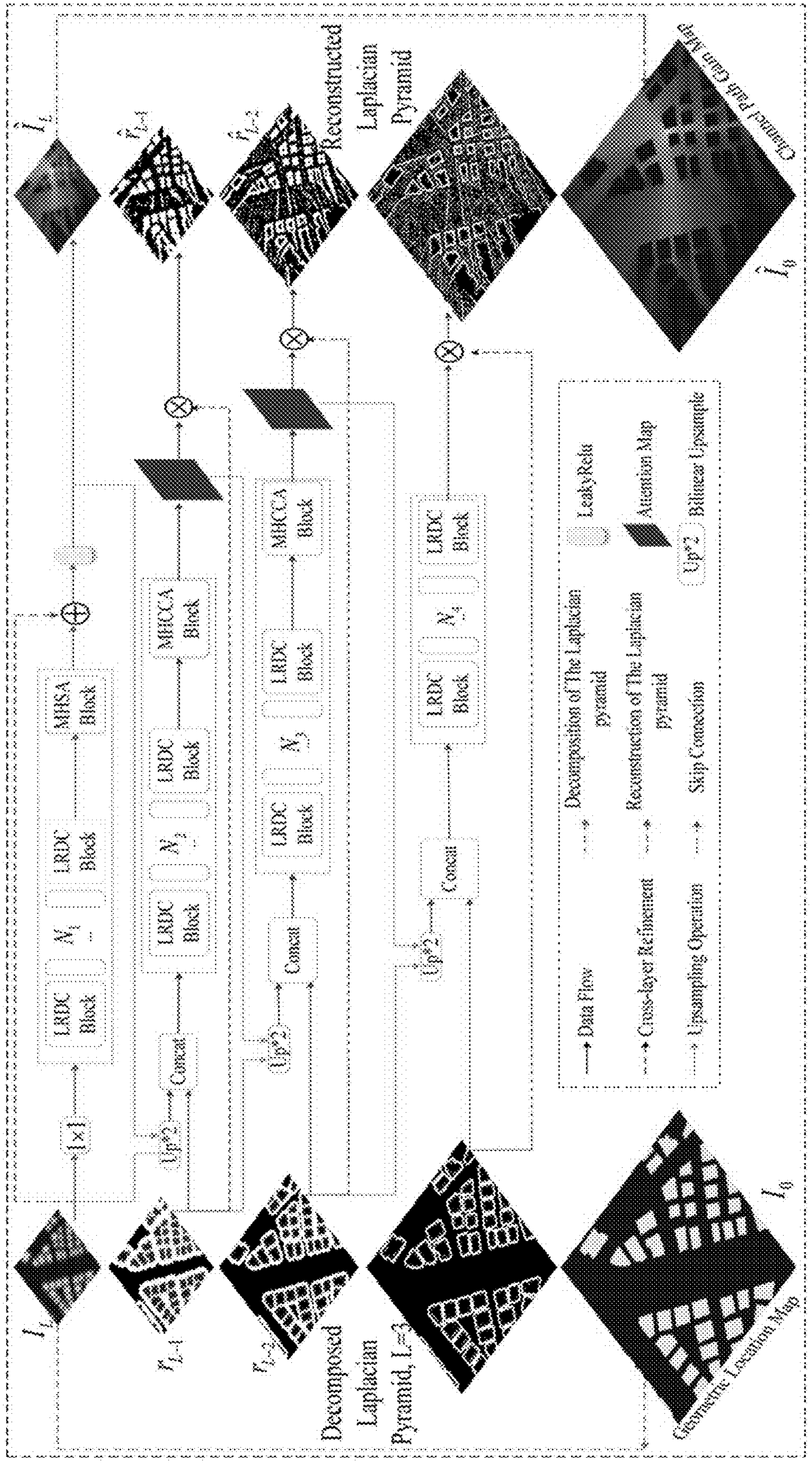
FIG. 2 is a frame diagram of a model for rapidly constructing a channel knowledge map according to an embodiment of the present invention.

As shown in FIG. 1 and FIG. 2, an embodiment of the present invention discloses a method for rapidly constructing a wireless channel knowledge map. A channel knowledge map construction problem is transformed into an image-to-image inpainting task, and the frequency components with different importance are extracted by using a Laplacian pyramid, whereby corresponding subnetworks are designed according to the importance of different components to increase the overall reconstruction speed. Self-attention mechanism and cross attention mechanism are introduced to encode global structure information, thereby improving the reconstruction accuracy and generalization ability of the model. The specific steps are as follows: (1) environment information of a targeted area is acquired, and the environment information is transformed into a 2D image format through a spatial discretization method and pixel-level grayscale transformation, thereby transforming a channel knowledge map construction problem into an image inpainting task. (2) An environment map is decomposed at different frequency bands by using a Laplacian pyramid to obtain different frequency components for feature extraction and reconstruction. (3) Reconstruction is performed on the low-frequency component. The input environment map is decomposed into submaps at different frequency bands, and feature extraction and reconstruction are completed by the specific attributes of the submaps. Firstly, a low-frequency submap $I_L$ is subjected to a 1×1 convolution to complete dimensional expansion in a depth direction. Then, the low-frequency submap is input into an lightweight residual dilated convolution (LRDC) module to deepen a feature extraction network and obtain the fusion of multi-scale features. Then, the low-frequency submap is input to an multi-head self-attention (MHSA) module to encode global random structure information into local features in the spatial dimension and learn richer hierarchical feature representations. Then, the number of color channels in the feature map is reduced to c to obtain the result $\hat{I}_L$. (4) Refinement on the high-frequency component is performed. The fusion result of the low-frequency submap $I_L$ and the reconstructed $\hat{I}_L$ is used to gradually guide the refinement $R=[r_0, r_1, r_2, \ldots, r_{L-1}]$ of the high-frequency component, thereby obtaining the components with different frequencies for reconstruction of CGM. Firstly, a low-frequency geometrical location submap $$I_L \in \mathbb{R}^{\frac{h}{2^L}\times\frac{w}{2^L}\times c}$$

and the predicted channel knowledge submap $$\hat{I}_L \in \mathbb{R}^{\frac{h}{2^L}\times\frac{w}{2^L}\times c}$$

are respectively bilinearly upsampled, and the spatial resolution is adjusted to $$\frac{h}{2^{L-1}}\times\frac{w}{2^{L-1}},$$

which is the same as the resolution of the high-frequency component $r_{L-1}$ in the $(L-1)^{th}$ layer. Then, $I_L$, $\hat{I}_L$ and $r_{L-1}$ are concatenated and defined as $$G^{L-1} \in \mathbb{R}^{\frac{h}{2^{L-1}}\times\frac{w}{2^{L-1}}\times c}.$$

Then, $$G^{L-1} \in \mathbb{R}^{\frac{h}{2^{L-1}}\times\frac{w}{2^{L-1}}\times c}$$

is input to the LRDC module, and the output is expressed as $$G^{L-1}_{out} \in \mathbb{R}^{\frac{h}{2^{L-1}}\times\frac{w}{2^{L-1}}\times c}.$$

Then, the extracted multi-scale feature map is input to the multi-head cross-covariance attention (MHCCA) module to perform attention operation along the feature dimension. Finally, an attention map for refining the high-frequency component $r_{L-1}$ is obtained. Through the above steps, all the high-frequency components of the Laplacian pyramid can be gradually refined, and the prediction results $\hat{R}=[\hat{r}_0, \hat{r}_1, \hat{r}_2, \ldots, \hat{r}_{L-1}]$ of different components can be obtained. Under the help of $\hat{I}_L$ and $\hat{R}=[\hat{r}_0, \hat{r}_1, \hat{r}_2, \ldots, \hat{r}_{L-1}]$, the channel knowledge map $\hat{I}_0$ can be reconstructed through the inverse operation of the Laplacian pyramid. In this example, $N_1$, $N_2$, $N_3$ and $N_4$ are set to 4, 3, 3 and 2, respectively. (5) The loss function of the whole network model is designed as a mean square error of the channel knowledge map output by the network and the real channel knowledge map, namely, $$\min_{\Theta} \mathcal{L}(\mathbb{G}_k, \hat{\mathbb{G}}_k) = \mathbb{E}\left\{\sum_{K} \|\mathbb{G}_k - \mathcal{R}_g(\mathbb{F}_k(x_n, \mathfrak{e}); \Theta)\|_2^2\right\},$$

where $\hat{\mathbb{G}}_k$ is the reconstructed channel knowledge map, $\mathbb{G}_k$ is the real channel knowledge map, $\mathcal{R}_g$ represents the constructed network model, $\Theta$ is a parameter set to be learned in $\mathcal{R}_g$, and $\|\cdot\|_2$ represents Euclidean norm. (6) The data sets are divided into training sets (40000), validation sets (8000) and test sets (8000) in a ratio of 5:1:1. (7) The above model is trained by using an Adam optimization algorithm in an end-to-end supervised training mode. In the training process, batchsize is set to 15, and the learning rate is set to 0.0001, the training sets are traversed for 50 rounds in the training strategy. In the training process, the weight parameter of the model is adjusted with the validation sets, and the final performance of the model is tested with the test sets. (8) The trained model is applied to the rapid reconstruction of the channel knowledge map in the targeted area in the wireless communication system. Different frequency components are obtained from the input environment map by using the Laplacian pyramid, whereby the channel knowledge map in the targeted area can be output after the model is input.

Figure 3:
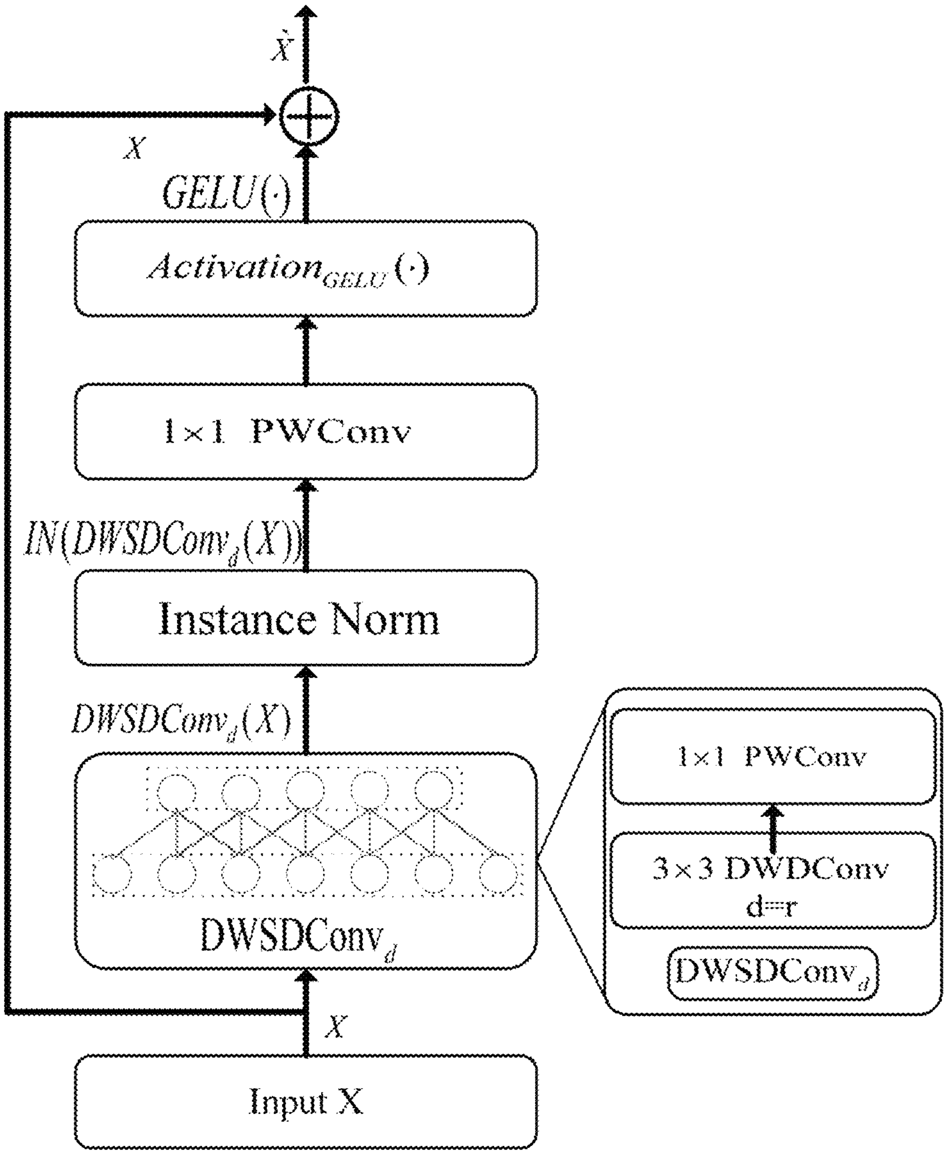
FIG. 3 is a schematic diagram of an LRDC module according to an embodiment of the present invention.
Figure 4:
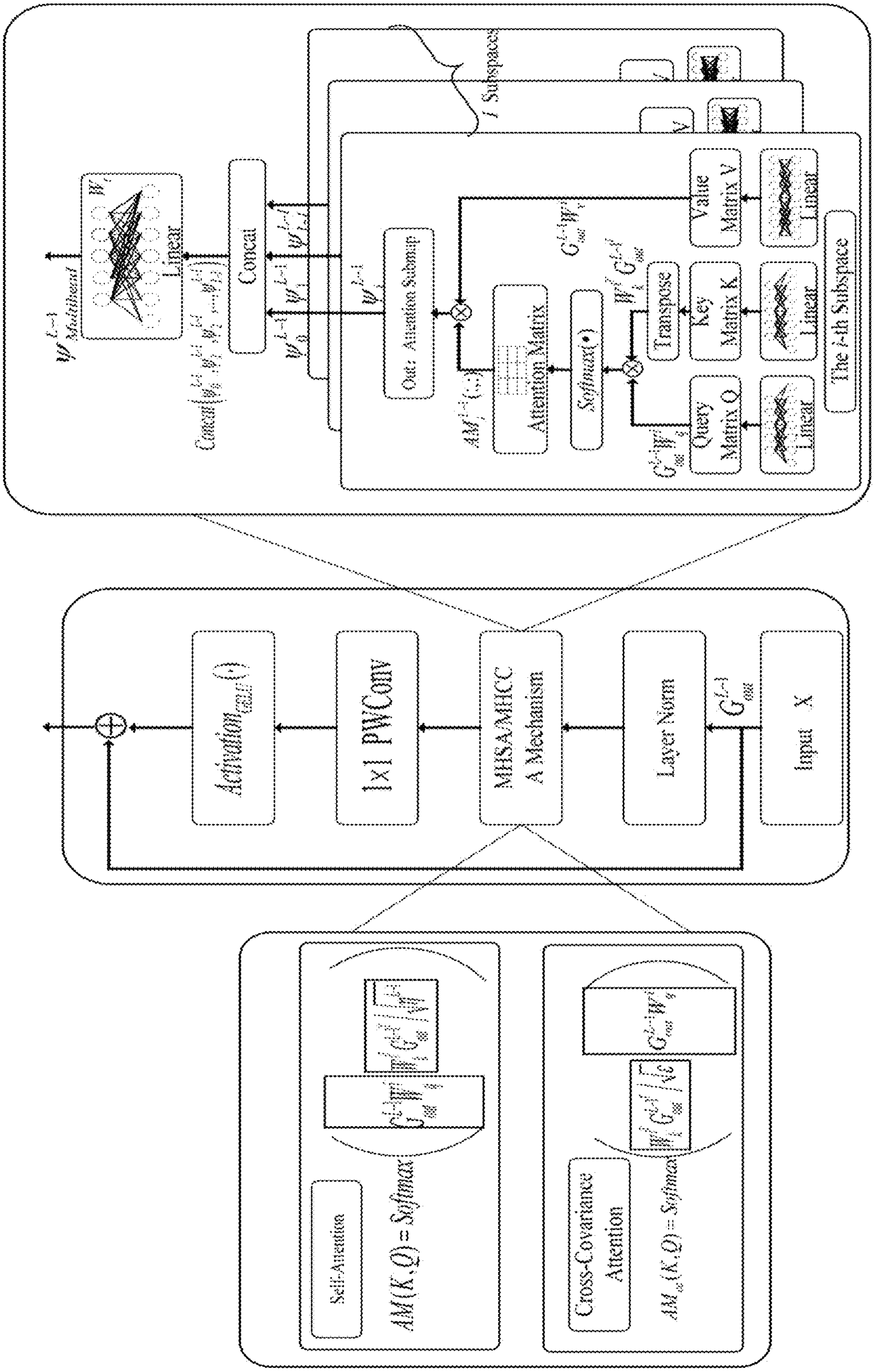
FIG. 4 is a schematic diagram of an MHSA module and an MHCCA module according to an embodiment of the present invention.

FIG. 3 illustrates the specific framework components of the LRDC module; and FIG. 4 illustrates the specific framework components of the MHSA module and the MHCCA module.

To enable those skilled in the art to better understand the solution of the present invention, the specific steps of the embodiment of the present invention are described below in conjunction with specific scenarios and by taking the prediction of the channel gain as an example.

I. System

Consider a wireless communication scenario in a square coverage area $A \subset \mathbb{R}^2$, , including a base station (BS) and N user equipments (UE). The signal power attenuation observed at a UE may be caused by different factors, for example, propagation losses in different paths, reflections and diffractions from buildings, waveguide effects in streets and obstacle blockages. Among these effects, the relatively slowly-varying parts together contribute to a channel gain function, defined as $G_L(e, x_n, f)$, which describes the large-scale signal attenuation measured at the UE location $$\{x_n\}_{n=1}^{N} = A$$

at a finite set of frequencies $f \in \{f_1, f_2, \ldots, f_{N_f}\}$. Notably, $G_L(e, x_n, f)$ is significantly affected by the propagation environment, denoted as e. In addition, the small-scale effect is typically modeled as a complex Gaussian random variable H with unit variance. A baseband signal received at the UE may be described as:

$$Y = \sqrt{G_L(\mathfrak{e}, x_n, f)}HX + Z \tag{1}$$

where X is a transmitting signal with a power of $P_X$, and Z is an additive noise with a one-sided power spectral density of $N_0$. Then the average received energy per symbol is $$\mathbb{E}[|Y|^2] = \frac{G_L(\mathfrak{e}, x_n, f)P_X}{B} + N_0 \tag{2}$$

where B denotes the signal bandwidth. The signal-to-noise ratio (SNR) at the input end of a UE baseband processor is:

$$SNR = \frac{G_L(\mathfrak{e}, x_n, f)P_X}{N_0 B} \tag{3}$$

for the convenience of processing, the channel gain is defined in the decibel (dB) scale:

$$P_g(\mathfrak{e}, x_n, f) = \left(\mathbb{E}[|Y|^2]\right)_{dB} - (P_X)_{dB} \tag{4}$$

This definition describes the received power variation (caused by the propagation and noise environment) at the user location $x_n$. The accurate estimation of $P_g$ at each location is the key to constructing a fine-grained channel gain map (CGM).

II. Problem formulation

For any $x_n \in A$, the objective of the present invention is to predict the corresponding $P_g$ defined in (4). To this end, it is necessary to construct a CGM, defined as $f_\Theta$, which provides mapping from all possible user locations $x_n$ to the corresponding $P_g$, namely, $$f_\Theta : x_n \in A \xrightarrow{G_L(\mathfrak{e}, x_n, f)} P_g \tag{5}$$

Building this mapping (5) is tricky, because $G_L(e, x_n, f)$ is affected by the actual propagation environment, and analytical path loss and shadowing models can only provide a rough approximation. Therefore, it is challenging to accurately acquire a global and complete CGM corresponding to the targeted area.

Stochastic modeling ignores environment information, such as he morphology of streets, buildings, and spatial geometric relationships. In contrast, in the image inpainting tasks, feature extraction and representation focus on learning the intrinsic structure of images. Image inpainting technique is applied in the CGM construction problem of the present invention. Let the input to the neural network be an environment map, a geometric location map is input in this example, and the output is the desired CGM. The difference between the two is the channel gain to be estimated, which can be regarded as the content to be repaired in the image inpainting task. The CGM construction problem is transformed into an image inpainting task, which predicts the channel gains at UE locations by recovering the corresponding pixels in the image matrix. Then, the present invention proposes an efficient CGM reconstructed network, defined as $\mathcal{R}_g$ , and Θ is expressed as a parameter set to be learned in $\mathcal{R}_g$ , . In the supervised training mode, a set of training samples are provided, including the input environment map $\mathbb{F}_k$ $(x_n, e)$ and the corresponding output CGM, defined as $\mathbb{G}_k$ , where k=1, . . . , K, K being the number of the training samples. The environmental map $\mathbb{F}_k$ $(x_n, e)$ mainly includes the environment e, such as base station location, buildings, roads, and vehicles, which are saved in a PNG image format. The goal of model training is to continuously optimize the parameter set Θ of $\mathcal{R}_g$ , , using $\mathbb{F}_k$ $(x_n, e)$ as prior knowledge to efficiently reconstruct the desired CGM, namely, $$\underbrace{\lim_{e\to\infty} R_g(\mathbb{F}_k(x_n, \mathfrak{e}); \Theta)}_{\hat{\mathbb{G}}_k} = \mathbb{G}_k \tag{6}$$

where $\hat{\mathbb{G}}_k$ is the reconstructed CGM. Therefore, from the perspective of image inpainting, the CGM construction problem may be formulated as:

$$\min_{\Theta}\mathcal{L}(\mathbb{G}_k, \hat{\mathbb{G}}_k) = \mathbb{E}\left\{\sum_{K}\|\mathbb{G}_k - \mathcal{R}_g(\mathbb{F}_k(x_n, \mathfrak{e}); \Theta)\|_2^2\right\} \quad (7)$$

$$\text{s.t. } x_n \in A, k \in \{K\}$$

where $\|\cdot\|_2$ represents Euclidean norm. The parameter set $\Theta$ can be learned by a gradient descent-based optimizer, for example, the adaptive momentum estimation (Adam) optimizer.

III. Laplacian Pyramid-Based CGM Reconstruction

1. Spatial Discretization and Grayscale Conversion of Geometric Location Map and Channel Gain For a targeted location area A, discretization is performed along the geometric spacial dimensions, namely, along the X axis and the Y axis, and $\Delta_x$ and $\Delta_y$ are respectively taken as the minimum spacing units, and the targeted location area is gridded as a 2D vectogram with $N_x$ rows and $N_y$ columns. Each spacial grid is expressed as $\Gamma_{i,j}$, where i=1, 2, . . . , $N_g$ and j=1, 2, . . . , $N_y$. The $(i, j)^{th}$ spacial grid may be expressed as:

$$\Gamma_{i,j} := [i\Delta_x, j\Delta_y]^T \quad (8)$$

for the convenience of expression, let $\mathcal{A}_{i,j} \subset \{1, \ldots, N\}$ represent an index set of all UE location coordinates contained in the $(i, j)^{th}$ spacial grid. This spatial discretization process is performed according to the minimum distance criterion, namely, if and only if $\|\Gamma_{i,j}-x_n\| \leq \|\Gamma_{i',j'}-x_n\|$, $\forall(i', j') \neq (i, j)$, $n \in \mathcal{A}_{i,j}$. When the equation is satisfied, $x_n \in \mathcal{A}_{i,j}$ or $x_n \in \mathcal{A}_{i,j}$ is arbitrarily determined.

The channel gain vector $P_g(f) = \mathbb{R}^{N\times 1}$ of the spatial location set $$\{x_n\}_{n=1}^{N}$$

is re-arranged into a 2D channel gain matrix $P_g(f) \in \mathbb{R}^{N_x \times N_y}$ by discretizing the geometric location of the UE. It should be noted that based on the above grid allocation method, if $N < N_x N_y$, the component value of the vector $P_g(f)$ cannot completely fill the matrix $P_f(f)$. In this case, the blank part in the matrix $P_g(f)$ is filled with 0. The channel gain of the $(i, j)^{th}$ spacial grid is defined as $[P_g(f)]_{i,j} = P_g(\Gamma_{i,j}, f)$. In addition, when a plurality of frequencies is considered, the 2D CGM may be concatenated in the frequency dimension to form a tensor representation $P_g \in \mathbb{R}^{N_x \times N_y \times N_f}$ namely, $$[P_g]_{i,j,n_f} = P_g(\Gamma_{i,j}, f_{n_f}) \quad (9)$$

Apparently, if the discretized geometric location map has a high spatial resolution, namely, when $\Delta_x$, and $\Delta_y$ are small enough, for $$n \in \mathcal{A}_{i,j}, \lim_{\Delta x, \Delta y \to 0} \Gamma_{i,j} = x_n$$

is satisfied. For $|\mathcal{A}_{i,j}| > 0$, the channel gain of the continuous location coordinates can be well approximated and expressed as:

$$\lim_{\Delta x, \Delta y \to 0} P_g(\Gamma_{i,j}, f) = \frac{1}{|\mathcal{A}_{i,j}|}\sum_{n \in \mathcal{A}_{i,j}} P_g(x_n, f) \quad (10)$$

It is noted that in (10), when $\Delta_x$ and $\Delta_y$ are close to 0, each set $A_{i,j}$ has at most one element. Therefore, the summation symbol on the left of (10) is only for the convenience of symbols, and there is at most one item in the summation. The spatial discretization transformation allows the channel gain estimation at the continuous location to be transformed into the prediction of pixels or grids, which also facilitates the subsequent design of the neural network.

Through the above operation, the channel gain $P_g(\Gamma_{i,j}, f)$ corresponding to the spacial grid $\Gamma_{i,j}$ is regarded as the value of the corresponding pixel point in the image matrix, which requires grayscale conversion before further processing. To this end, the value is converted into a range of 0 to 1 by using min-max normalization. The gray-level channel gain may be expressed as:

$$P'_g(\Gamma_{i,j}, f) = \frac{P_g(\Gamma_{i,j}, f) - \min(P_g(\Gamma_{i,j}, f))}{\max(P_g(\Gamma_{i,j}, f)) - \min(P_g(\Gamma_{i,j}, f))} \quad (11)$$

2. Laplacian Pyramid-Based Frequency Band Decomposition

Given an input image $I_0$ with a size of h×w. Firstly, a low-pass estimation $$I_1 \in \mathbb{R}^{\frac{h}{2}\times\frac{w}{2}}$$

is obtained by using the Laplacian pyramid, where each pixel is a weighted average of the neighboring pixels based on an octave Gaussian filter. To ensure the reversibility of image reconstruction, the Laplacian pyramid retains high-frequency residual information $r_0 = I_0 - \tilde{I}_0$, where $\tilde{I}_0$ represents the upsampled result from $I_1$. To further reduce the input resolution, the above operations are is performed iteratively by the Laplacian pyramid on $I_1$ to generate a series of low-frequency and high-frequency components. The irreversibility problem of upsampling and downsampling is solved by the reversible and closed-form decomposition attributes of the Laplace pyramid. In addition, the high-resolution input can be decomposed by the Laplacian pyramid into a plurality of submaps with different spatial resolutions, which brings the benefit of fusing multi-scale feature information.

3. Laplacian Pyramid-Based CGM Reconstructed Network

The present invention proposes an end-to-end Laplacian pyramid-based CGM reconstructed network (LPCGMN) to reduce the computational complexity while maintaining the competitive performance. The proposed Laplacian pyramid-based CGM reconstructed network includes the following two parts:

1) Reconstruction of the low-frequency component: the input environment map is decomposed into submaps at different frequency bands, and feature extraction and reconstruction are completed by using the specific attributes of the submaps. Firstly, a low-frequency submap $I_L$ is subjected to a 1×1 convolution to complete dimensional expansion in a depth direction. Then, the low-frequency submap is input into an LRDC module to deepen a feature extraction network and obtain the fusion of multi-scale features. Then, the low-frequency submap is input to an MHSA module to encode global random structure information into local features in the spatial dimension and learn richer hierarchical feature representations. Then, the number of color channels in the feature map is reduced to C to obtain the result $\hat{I}z$.

2) Refinement of the high-frequency component: the fusion result of $I_L$ and $\hat{I}_L$ is used to gradually guide the refinement $R=[r_0, r_1, r_2, \ldots, r_{L-1}]$ of the high-frequency component, thereby obtaining the components with different frequencies for reconstruction of CGM. Firstly, a low-frequency environmental submap $$I_L \in \mathbb{R}^{\frac{h}{2^L} \times \frac{w}{2^L} \times c}$$

and the predicted channel gain submap $$\hat{I}_L \in \mathbb{R}^{\frac{h}{2^L} \times \frac{w}{2^L} \times c}$$

are respectively bilinearly upsampled, and the spatial resolution is adjusted to $$\frac{h}{2^{L-1}} \times \frac{w}{2^{L-1}},$$

which is the same as the resolution of the high-frequency component $r_{L-1}$ in the $(L-1)^{th}$ layer. Then, $I_L$, $\hat{I}_L$ and $r_{L-1}$ are concatenated and defined as $$G^{L-1} \in \mathbb{R}^{\frac{h}{2^{L-1}} \times \frac{w}{2^{L-1}} \times c}.$$

Then, the $$G^{L-1} \in \mathbb{R}^{\frac{h}{2^{L-1}} \times \frac{w}{2^{L-1}} \times c}$$

is input to the LRDC module, and the output is expressed as $$G_{out}^{L-1} \in \mathbb{R}^{\frac{h}{2^{L-1}} \times \frac{w}{2^{L-1}} \times c}.$$

Then, the extracted multi-scale feature map is input to the MHCCA module to perform attention operation along the feature dimension. Finally, an attention map for refining the high-frequency component $r_{L-1}$ is obtained. Therefore, through the above steps, all the high-frequency components of the Laplacian pyramid can be gradually refined, and the prediction results $\hat{R}=[\hat{r}_0, \hat{r}_1, \hat{r}_2, \ldots, \hat{r}_{L-1}]$ of different components can be obtained. Under the help of $\hat{I}_L$ and $\hat{R}=[\hat{r}_0, \hat{r}_1, \hat{r}_2, \ldots, \hat{r}_{L-1}]$, the channel gain map $\hat{I}_0$ can be reconstructed through the inverse operation of the Laplacian pyramid.

4. Three Modules in the Laplacian Pyramid-Based CGM Reconstructed Network

1) LRDC module: It mainly utilizes depthwise separable convolution and dilated convolution, which can obtain multi-scale features with fewer model parameters. Specifically, assuming d is defined as the dilated rate and k is the size of an ordinary convolution kernel, the actual size of the dilated convolution kernel is k'=k+ (k−1)(d−1) and the receptive field of the $(i+1)^{th}$ layer may be expressed as:

$$S_i = \sum_{i=1}^{I} \text{stride}_i \tag{12}$$

$$RF_{i+1} = RF_i + (k' - 1) \times S_i \tag{13}$$

where $\text{stride}_i$ is the sampling interval during the $i^{th}$ layer of convolution, $S_i$ is the product of all the strides of the previous (I−1) layers, and $RF_i$ is defined as the receptive field of the $i^{th}$ layer. When computing the receptive field of the $(i+1)^{th}$ layer, $RF_1$ is initialized to 1 by default. Assuming that x[n] represents the input, and the output can be denoted as:

$$y[n] = \sum_{k=1}^{K} x[n + k \cdot r] w[k] \tag{14}$$

where w[k] is a filter with a length of K. Considering an input feature X with a dimension of H×W×C, the LRDC module outputs $\hat{X}$ can be expressed as:

$$\hat{X} = X + GELU(PWConv(\text{IN}(DWSDConv_d(X)))) \tag{15}$$

where IN(•) is an instance normalization layer, GELU(•) is the Gaussian error linear unit (GELU) activation function, $DWSDConv_d(\bullet)$ represents a 3×3 depthwise separable convolution with a dilated rate of d, and PWConv(•) is a point convolution.

2) MHSA module: given an input $Z=[z_1, \ldots, z_m]^T \in \mathbb{R}^{d_m \times d_n}$,, $d_m$ is defined as the number of image patches, $d_n$ is defined as the feature dimension of each image patch, and three different linear transformations are applied to $z_j$:

$$k_j = z_j W^k,\ j = 1, \ldots, d_n \tag{16}$$

$$q_j = z_j W^q,\ j = 1, \ldots, d_n \tag{17}$$

$$v_j = z_j W^v,\ j = 1, \ldots, d_n \tag{18}$$

where $k_j \in \mathbb{R}^{1 \times d_k}$, $q_j \in \mathbb{R}^{1 \times d_q}$ and $v_j \in \mathbb{R}^{1 \times d_n}$ are key, query and value vectors, respectively. $W^k \in \mathbb{R}^{d_n \times d_k}$, $W^q \in \mathbb{R}^{d_n \times d_q}$ and $W^v \in \mathbb{R}^{d_n \times d_n}$ respectively represent trainable transformation matrices. For the sake of clarity, (16) to (18) are expressed in a matrix form:

$$K=ZW^k \tag{19}$$

$$Q=ZW^q \tag{20}$$

$$V=ZW^v \tag{21}$$

where $K=[k_1, \ldots, k_m]^T \in \mathbb{R}^{d_m \times d_k}$, $Q=[q_1, \ldots, q_m]^T \in \mathbb{R}^{d_m \times d_q}$ and $V=[v_1, \ldots, v_m]^T \in \mathbb{R}^{d_m \times d_n}$. By means of K and Q, an attention matrix $AM \in \mathbb{R}^{d_m \times d_m}$ can be obtained, which can be expressed as follows:

$$AM = \text{Softmax}\left(\frac{QK^T}{\sqrt{\eta}}\right) \quad (22)$$

where $\sqrt{\eta}$ is a scaling factor. Therefore, the $r^{th}$ component is output for the attention mechanism, which can be expressed as the weighted sum of all inputs:

$$o_r = \sum_j AM[r, j]v_j = AM[r, :] \cdot V \quad (23)$$

where $o_r \in \mathbb{R}^{1\times d_n}$ represents the $r^{th}$ output, which is calculated by adaptively focusing on the inputs based on the attention score AM[r, j]. Finally, the overall attention map can be expressed as:

$$O = AM[:, :] \cdot V = \text{Softmax}\left(\frac{ZW^q W^{k^T} Z^T}{\sqrt{\eta}}\right) ZW^v \quad (24)$$

where $O=[o_1, \ldots, o_m]^T \in \mathbb{R}^{d_m \times d_n}$.,

Based on the above, the present invention proposes an MHSA module for CGM construction. Specifically, given the output $$G_{out}^{L-1} \in \mathbb{R}^{\hat{H}\times\hat{W}\times\hat{C}}$$

of the LRDC module at the $(L-1)^{th}$ layer, firstly, the output is input to the normalization layer, and then linearly transformed to obtain a query vector $$Q = G_{out}^{L-1} W^q,$$

a key vector $$K = G_{out}^{L-1} W^k$$

and a value vector $$V = G_{out}^{L-1} W^v.$$

Then, a single-head self-attention map is obtained by:

$$\psi = Softmax\left(\frac{G_{out}^{L-1} W^q W^{k^T} G_{out}^{L-1^T}}{\sqrt{\eta}}\right) G_{out}^{L-1} W^v \quad (25)$$

According to (25), the map can be extended to a multi-head self-attention learning mechanism. Firstly, the learned self-attention submap in the $i^{th}$ subspace can be calculated by:

$$\tilde{G}_{out,i}^{L-1} = G_{out}^{L-1} W^i \quad (26)$$

-continued $$\psi_i^{L-1} = Softmax\left(\frac{\tilde{G}_{out,i}^{L-1}, \tilde{G}_{out,i}^{L-1^T}}{\sqrt{\eta^{L-1}}}\right) \quad (27)$$

where $$\tilde{G}_{out,i}^{L-1}$$

is the mapping of $$G_{out}^{L-1}$$

in the $i^{th}$ learned subspace. $W^i$ is a trainable transformation matrix, expressed as:

$$W^i = \begin{cases} W_i^q, & \text{if } W^i \text{ is the linear transformation of } Q \\ W_i^k, & \text{else} \end{cases} \quad (28)$$

(28) can map $$G_{out}^{L-1}$$

into different self-attention learning subspaces to form a I-head self-attention map. Then, the self-attention submaps corresponding to the I transformed subspaces are concatenated by:

$$\psi_{Multihead}^{L-1} = Concat(\psi_0^{L-1}, \psi_1^{L-1}, \psi_2^{L-1}, \ldots, \psi_{I-1}^{L-1})\ W_t \quad (29)$$

$$\tilde{\psi}_{Multihead}^{L-1} = GELU\left(PWConv(\psi_{Multihead}^{L-1})\right) + G_{out}^{L-1} \quad (30)$$

where $W_t$ is a trainable matrix, $$\tilde{\psi}_{Multihead}^{L-1} \in \mathbb{R}^{\frac{h}{2^{L-1}}\times\frac{w}{2^{L-1}}\times 1},$$

$i \in [1, L]$, and I is the number of the parallel self-attention learning subspaces. The obtained self-attention map $$\tilde{\psi}_{Multihead}^{L-1}$$

is used for the refinement of the high-frequency submap $r_{L-1}$:

$$\hat{r}_{L-1} = r_{L-1} \otimes \tilde{\psi}_{Multihead}^{L-1} \quad (31)$$

where $\otimes$ represents the pixel-level multiplication. The pixel-level refinement of the high-frequency component $$r_{L-1} \in \mathbb{R}^{\frac{h}{2^{L-1}} \times \frac{w}{2^{L-1}} \times 1}$$

at the $(L-1)^{th}$ layer of the Laplacian pyramid through the above steps.

For the refinement of the remaining frequency components $R=[r_0, r_1, r_2, \ldots, r_{L-2}]$, $$\tilde{\psi}^{L-1}_{Multihead}$$

is extended to the corresponding self-attention map $$\left[\tilde{\psi}^{L-2}_{Multihead}, \ldots, \tilde{\psi}^{1}_{Multihead}, \tilde{\psi}^{0}_{Multihead}\right],$$

and the refined results $[\hat{r}_{L-1}, \hat{r}_{L-2}, \ldots, \hat{r}_1, \hat{r}_0]$ of the remaining frequency components are obtained through the upsampling operation and the LRDC and MHCC modules, where $$\tilde{\psi}^{L-2}_{Multihead} \in \mathbb{R}^{\frac{h}{2^{L-2}} \times \frac{w}{2^{L-1}} \times 1},$$

and $$\tilde{\psi}^{0}_{Multihead} \in \mathbb{R}^{h \times w \times 1}.$$

Then, with the help of the reversibility of the Laplace pyramid, the CGM of the target is obtained using the reconstructed $\hat{I}_L$ and the refined $[\hat{r}_{L-1}, \hat{r}_{L-2}, \ldots, \hat{r}_1, \hat{r}_0]$.

3) MHCCA module: the MHCCA module utilizes the cross-covariance attention mechanism to compute the attention score along the feature dimension instead of the space (or token) dimension, which is the transposed version of the self-attention (22) and can be expressed as:

$$AM_{cc}(Q, K) = Softmax\left(\frac{K^T Q}{\varepsilon}\right) \quad (32)$$

$$\psi_{cc} = V \cdot AM_{cc}(Q, K) \quad (33)$$

where $AM_{cc}(Q,K)$ and $\psi_{cc}$ are a cross-covariance attention matrix and map, respectively. $\varepsilon$ is a learnable scaling parameter.

IV. Implementation Effect

To enable those skilled in the art to better understand the solution of the present invention, a comparison of the estimation performance between the channel knowledge map reconstruction method in this embodiment and the existing method in several specific system configurations is given below.

Figure 5:
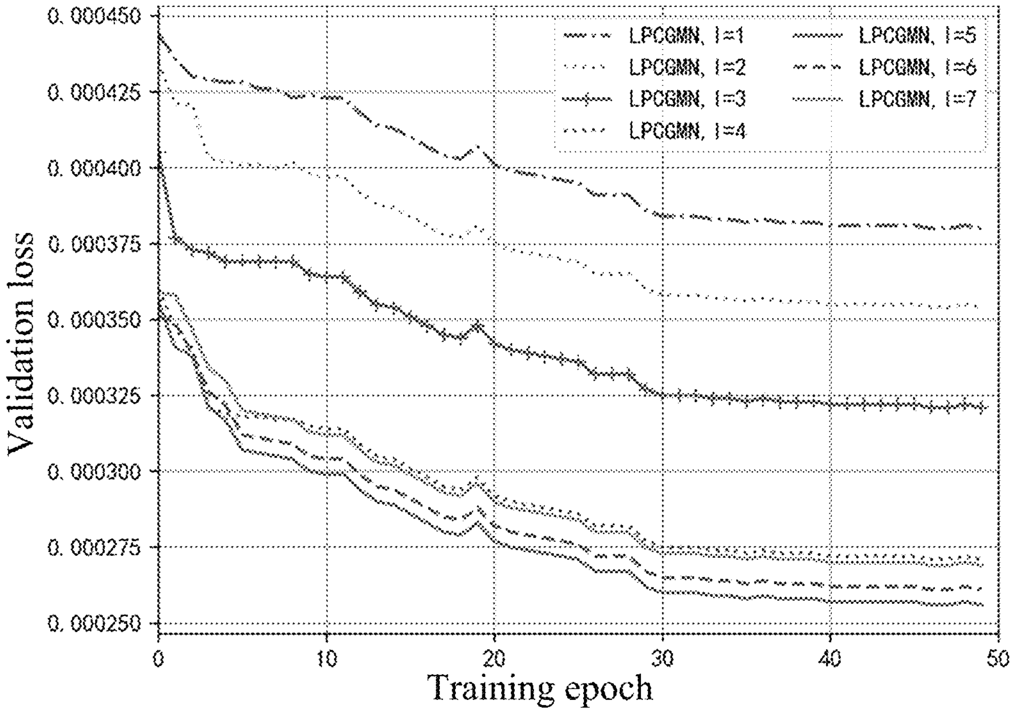
FIG. 5 is a schematic diagram of the influence of the number of attention heads on the implementation performance effect when the layer number of a Laplacian pyramid is 3 according to an embodiment of the present invention.

Firstly, the influence of the number of attention heads on the implementation performance effect of this embodiment is given when the layer number of the Laplacian pyramid is 3. When the number of attention heads increases from 1 to 5, the proposed LPCGMN has good robustness when increasing the number I of attention heads to reduce the prediction error. Specifically, as shown in FIG. 5, compared with LPCGMN with I=1, the reconstruction gain of LPCGMN with I=5 is increased by 1.72 dB. However, when I is set to be too large, for example, greater than 5, the prediction error of the proposed LPCGMN does not decrease accordingly, but slightly increases. Compared with LPCGMN with I=5, LPCGMN with I=6 and I=7 reduces the performance gain by 0.66 dB and 0.22 dB, respectively. Analysis shows that this is because the size of the tested image is not large enough. However, when the number of learning subspaces is too large, more subspaces lose their mutual independence, resulting in the overlapping phenomenon between them, which affects the effective learning of LPCGMN, and the stagnation state appears.

Figure 6:
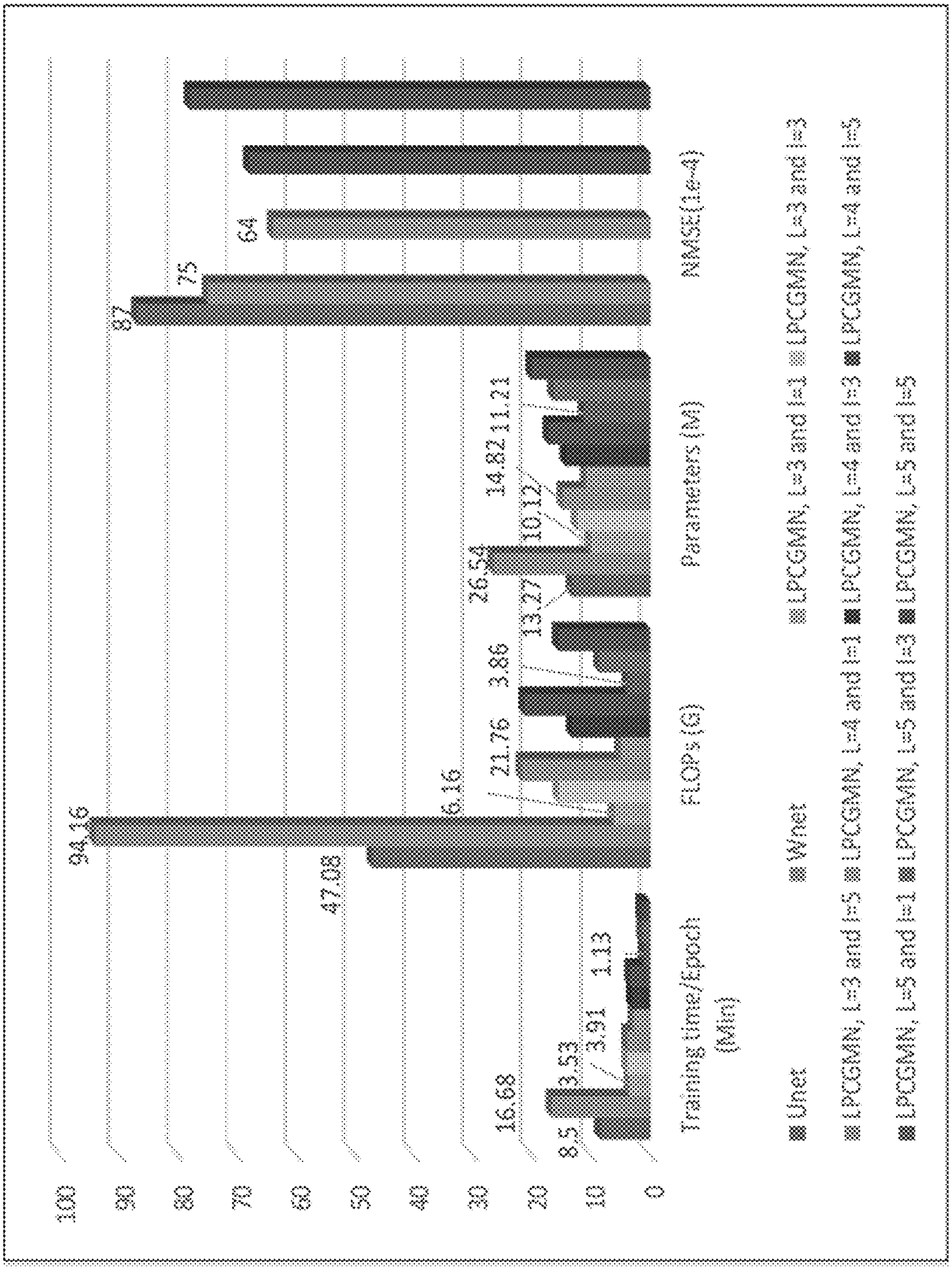
FIG. 6 is a schematic diagram comparing the channel gain map reconstruction performance between a construction method according to an embodiment of the present invention and an existing method.

Then, a schematic diagram of complexity comparison between the LPCGMN in this embodiment and the existing methods is given. The existing methods for comparison are the Unet method proposed in the literature "U-Net: Convolutional networks for biomedical image segmentation," in Proc. Int. Conf. Med. Image Comput. Comput.-Assist. Interv. (MICCAI), Munich, Germany, October 2015, pp. 234-241." and the Wnet method proposed in the literature "RadioUnet: Fast radio map estimation with convolutional neural networks," IEEE Trans. Wirel. Commun., vol. 20, no. 6, pp. 4001-415 June 2021." FIG. 6 gives the comparison of the LPCGMN in this embodiment with the Unet and Wnet methods on the same data set in the wireless communication system under consideration, where the designed performance indicators include the time spent per training epoch, the time complexity (FLOPs), the storage complexity (Parameters) and the prediction error (normalized mean square error (NMSE)). The training epochs of LPCGMN, Unet and Wnet are all set to 50. It can be seen from FIG. 6 that in terms of the training time in each period, Wnet requires longer training time, about 16.68 min. The proposed LPCGMN (L=5, I=1) requires the shortest training time, about 1.13 min. In terms of the indicator FLOPs, Wnet is still the highest, about 94.16 Giga FLOPs. In contrast, LPCGMN (L=3, I=1) and LPCGMN (L=5, I=1) are 6.16 and 3.86 Giga FLOPs, respectively. In addition, the proposed LPCGMN performs stably when increasing the layer number of LP to reduce FLOPs. In terms of model parameters, the most lightweight model is LPCGMN (L=3, I=1), which has about 10.12 million parameters, while Wnet has more model parameters, about 26.54 million. In terms of NMSE, the proposed LPCGMN (L=3, I=5) has a lower reconstruction error, about 0.0064. This shows that the LPCGMN in this embodiment can accurately construct the CGM at a higher speed compared with the Unet and Wnet methods.

Based on the same inventive concept, an embodiment of the present invention discloses a computer device, including a memory, a processor, and a computer program stored in the memory and executable on the processor, where the computer program is configured to, when loaded to the processor, implement the method for rapidly constructing a wireless channel knowledge map which is suitable for the base station or user terminal.

In a specific implementation, the device includes a processor, a communication bus, a memory and a communication interface. The processor may be a universal central processing unit (CPU), a microprocessor, an application-specific integrated circuit (ASIC), or one or more integrated circuits for controlling the execution of the program in the solution of the present invention. The communication bus may include a pathway for communicating information between the above-mentioned components. As the communication interface, any apparatus such as a transceiver is used for communicating with other devices or communication networks. The memory may be a read only memory (ROM) or other type of static storage device capable of storing static information and instructions, a random access memory (RAM) or other type of dynamic storage device capable of storing information and instructions, or may be an electrically erasable programmable read only memory (EEPROM), a compact disc read only memory (CD-ROM) or other optical disk storage, disk storage media or other magnetic storage devices, or any other medium that can be used to carry or store desired program codes in the form of instructions or data structures and that can be accessed by a computer, but is not limited thereto. The memory can exist independently and be connected to the processor through a bus. The memory can also be integrated with the processor.

The memory is used to store application codes for executing the solution of the present invention, and the execution is controlled by the processor. The processor is used to execute the application codes stored in the memory, thereby implementing the channel estimation method provided by the above embodiment. The processor can include one or more CPUs, or can include multiple processors. Each of these processors may be a single-core processor or a multi-core processor. The processor herein may refer to one or more devices, circuits, and/or processing kernels for processing data (for example, computer program instructions).

Based on the same inventive concept, an embodiment of the present invention discloses a wireless communication system, including a base station and a plurality of user terminals. The base station or the user terminal is provided with: an information processing module, configured to acquire environment information of a targeted area, and transform the environment information into a 2D image format through a spatial discretization method and pixel-level grayscale transformation, thereby transforming a channel knowledge map construction problem into an image inpainting task; a frequency band decomposition module, configured to decompose an environment map at different frequency bands by using a Laplacian pyramid to obtain different frequency components; a network model construction module, configured to construct a channel knowledge map reconstruction network model, where the network model designs different subnetworks for different frequency components of the environment map for feature extraction, different frequency components are output through the respective subnetworks, and then the channel knowledge map is reconstructed by the inverse operation of the Laplacian pyramid; a model training module, configured to give a training set including the environment map and the corresponding channel knowledge map, and train the constructed network model in an end-to-end supervised training mode to obtain optimal parameters of the model; and a prediction module, configured to predict channel knowledge information of user equipment at a specific location in the targeted area by the trained model. The specific implementation of each module can be found in the above-mentioned method embodiment and will not be repeated here.

In the embodiments provided in the present application, it is understood that the disclosed methods can be implemented in other ways without exceeding the spirit and scope of the present application. The present embodiment is only an illustrative example and should not be taken as limiting, and the specific content given should not limit the objective of the present application. For example, some features may be ignored, or not performed.

The above merely describes specific embodiments of the present invention, but the protection scope of the present invention is not limited thereto. Any changes or substitutions that can be easily conceived by those skilled in the art within the technical scope disclosed in the present invention, shall fall within the protection scope of the present invention. Therefore, the protection scope of the present invention is subject to the protection scope of the appended claims.

What is claimed is:

1. A method for rapidly constructing a wireless channel knowledge map, comprising the following steps:

acquiring environment information of a targeted area, and transforming the environment information into a 2D image format through a spatial discretization method and pixel-level grayscale transformation, thereby transforming a channel knowledge map construction problem into an image inpainting task;

decomposing an environment map at different frequency bands by using a Laplacian pyramid to obtain different frequency components;

constructing a channel knowledge map reconstruction network model, wherein the network model designs different subnetworks for different frequency components of the environment map for feature extraction, and the channel knowledge map is reconstructed by the different frequency components with assistance of an inverse operation of the Laplacian pyramid after outputting through the respective subnetworks;

giving a training set comprising the environment map and the corresponding channel knowledge map, and training the constructed network model in an end-to-end supervised training mode to obtain optimal parameters of the model; and predicting channel knowledge information of user equipment at a specific location in the targeted area by the trained model.

2. The method for rapidly constructing a wireless channel knowledge map according to claim 1, wherein the transformation from the channel knowledge map construction problem to the image inpainting problem is to take each specific location as a pixel point of an image matrix, take channel knowledge corresponding to the specific location as a pixel value of the corresponding pixel point, and transform the problem of channel knowledge estimation of each specific location into the problem of inpainting pixels from image to image.

3. The method for rapidly constructing a wireless channel knowledge map according to claim 1, wherein the spatial discretization is to grid the environment information in the spatial dimension and divide the location of the user equipment to a nearest grid according to a minimum distance criterion.

4. The method for rapidly constructing a wireless channel knowledge map according to claim 1, wherein the grayscale transformation is implemented at a pixel level, and a channel knowledge value is converted into a range of 0 to 1 by using min-max normalization.

5. The method for rapidly constructing a wireless channel knowledge map according to claim 1, wherein for a pair of environment map and channel knowledge map, the difference in low-frequency components is more remarkable than that in high-frequency components; and feature extraction layers of subnetworks corresponding to the low-frequency components are more than feature extraction layers of subnetworks corresponding to the high-frequency components.

6. The method for rapidly constructing a wireless channel knowledge map according to claim 1, wherein the network model mainly comprises:

reconstruction on low-frequency component in a $L^{th}$ layer: firstly, a low-frequency environment submap $I_L$ is subjected to a point convolution to complete dimensional expansion in a depth direction, then is input to a plurality of stacked lightweight residual dilated convolution modules to deepen a feature extraction network and obtain a fusion of multi-scale features, and then is input to a multi-head self-attention module or a multi-head cross-covariance attention module to encode global random structure information into local features in the spatial dimension and learn richer hierarchical feature representations; and finally, a number of color channels in a feature map is reduced to an original size to obtain an output result $\hat{I}_L$;

refinement on high-frequency component in a $(L-1)^{th}$ layer: the low-frequency component and the reconstruction result thereof are fused to gradually guide the refinement of the high-frequency components in different layers so as to obtain the components with different frequencies for reconstruction of the channel knowledge map; firstly, the low-frequency environment submap $I_L$ and the predicted channel knowledge submap $\hat{I}_L$ are respectively bilinearly upsampled; then, the $I_L$, the $\hat{I}_L$ and the high-frequency component $r_{L-1}$ in the $(L-1)^{th}$ layer are concatenated and input to the plurality of stacked lightweight residual dilated convolution modules; then the extracted multi-scale feature map is input to the multi-head self-attention module or the multi-head cross-covariance attention module; and finally, the refined result of the high-frequency component in the $(L-1)^{th}$ layer $r_{L-1}$ and an attention map for refining the high-frequency component in a $(L-2)^{th}$ layer are obtained; and for the remaining frequency components $R=[r_0, \ldots, r_{L-2}]$, the high-frequency components of all layers of the Laplacian pyramid are gradually refined through iterative upsampling and concatenating operations, the lightweight residual dilated convolution module, and the multi-head self-attention module or the multi-head cross-covariance attention module, and the prediction results of different components are obtained.

7. The method for rapidly constructing a wireless channel knowledge map according to claim 6, wherein the lightweight residual dilated convolution module is formed by a depthwise separable dilated convolution layer, an instance normalization layer, a point convolution layer and a GELU activation function layer and is used for extraction and representation of features; the multi-head self-attention module is formed by a normalization layer, a multi-head self-attention layer, a point convolution layer and a GELU activation function layer; and the multi-head cross-covariance attention module is formed by a normalization layer, a multi-head cross-covariance attention layer, a point convolution layer and a GELU activation function layer, and is used for encoding global environment information.

8. The method for rapidly constructing a wireless channel knowledge map according to claim 1, wherein a loss function of the network module training is expressed as:

$$\mathcal{L}(\mathbb{G}_k, \hat{\mathbb{G}}_k) = \mathbb{E}\left\{\sum_K \|\mathbb{G}_k - \mathcal{R}_g(\mathbb{F}_k(x_n, e); \Theta)\|_2^2\right\},$$

wherein K denotes a total number of training set samples, $\widehat{\mathbb{G}}_k$ denotes the reconstructed channel knowledge map, $\mathbb{G}_k$ denotes a real channel knowledge map, $\mathcal{R}_g$ denotes the constructed network model, $\Theta$ denotes a parameter set to be learned in $\mathcal{R}_g$, $\mathbb{F}_k$ $(x_n, e)$ denotes the environment map, e denotes a propagation environment, $x_n$ denotes the location of the user equipment, and $\|\bullet\|_2$ denotes Euclidean norm.

9. A computer device, comprising a memory, a processor, and a computer program stored in the memory and executable on the processor, wherein the computer program is configured to, when loaded to the processor, implement the method for rapidly constructing a wireless channel knowledge map according to claim 1.

10. A wireless communication system, comprising a base station and a plurality of user terminals, wherein the base station or the user terminal is provided with:

an information processing module, configured to acquire environment information of a targeted area, and transform the environment information into a 2D image format through a spatial discretization method and pixel-level grayscale transformation, thereby transforming a channel knowledge map construction problem into an image inpainting task;

a frequency band decomposition module, configured to decompose an environment map at different frequency bands by using a Laplacian pyramid to obtain different frequency components;

a network model construction module, configured to construct a channel knowledge map reconstruction network model, wherein the network model designs different subnetworks for different frequency components of the environment map for feature extraction, and the channel knowledge map is reconstructed by the different frequency components with assistance of an inverse operation of the Laplacian pyramid after outputting through the respective subnetworks;

a model training module, configured to give a training set comprising the environment map and the corresponding channel knowledge map, and train the constructed network model in an end-to-end supervised training mode to obtain optimal parameters of the model; and a prediction module, configured to predict channel knowledge information of user equipment at a specific location in the targeted area by the trained model.

* * * * *